April 23, 1940.　　　　　F. M. WHITE　　　　　2,198,099
VEHICLE RUNNING GEAR
Filed Sept. 30, 1937　　　2 Sheets-Sheet 1
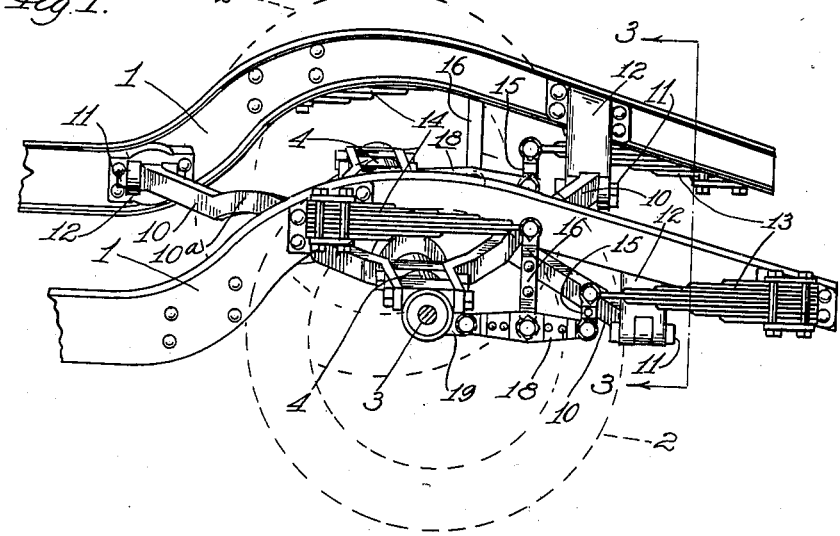
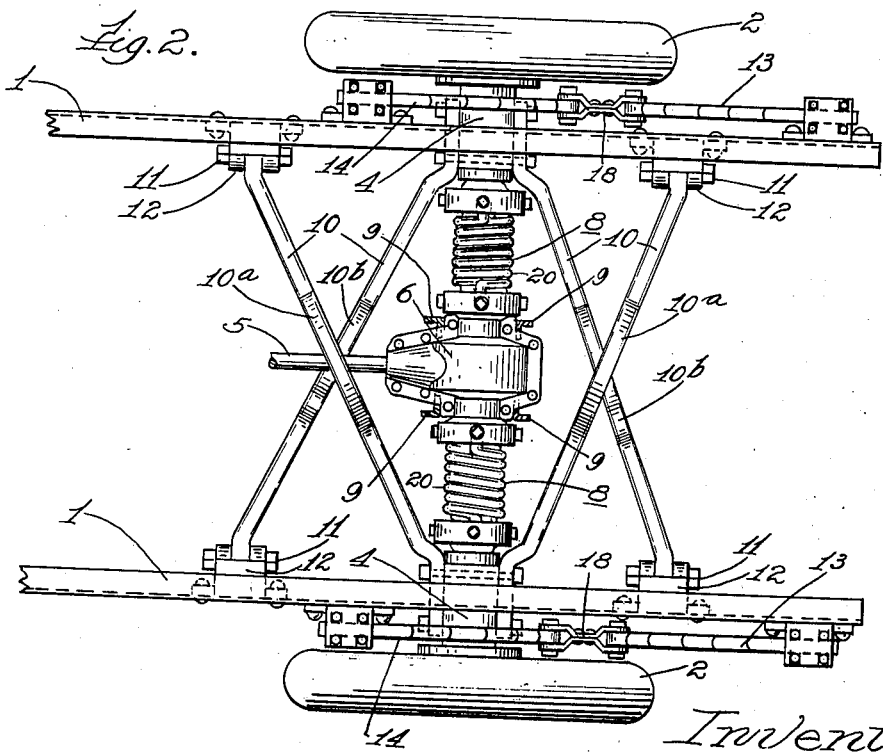
Witness
N.F. McKnight.
Inventor
Frank M. White
by Burton & Burton
his Attorneys April 23, 1940.  F. M. WHITE  2,198,099

VEHICLE RUNNING GEAR

Filed Sept. 30, 1937  2 Sheets-Sheet 2

Witness
H. C. McKnight

Inventor.
Frank M. White
by Burton & Burton
his Attorneys.

Patented Apr. 23, 1940

2,198,099

UNITED STATES PATENT OFFICE 2,198,099

VEHICLE RUNNING GEAR

Frank M. White, Chicago, Ill., assignor of one-fourth to Robert S. Smith, one-fourth to John K. Shuger and one-fourth to Elmer E. Colby, all of Chicago, Ill.

Application September 30, 1937, Serial No. 166,542

3 Claims. (Cl. 267—19)

This invention relates to a special running gear or chassis structure for vehicles, and particularly those of the automotive type, and one of its objects is to adapt such a vehicle to the use of a flexible drive connection. Another object is to so connect the wheels to the vehicle frame as to permit substantially independent vertical movement of each wheel relative to the frame. The invention consists of certain features and elements of construction in combination, as herein shown and described and as indicated by the claims.

In the drawings:

Figure 1 is a somewhat diagrammatic perspective view of the rear portion of an automobile frame showing parts of the axle structure and the drive mechanism associated therewith.

Figure 2 is a plan view of the same portion of the chassis, showing more clearly the relation of the special axle construction to the flexible drive members and to the remaining elements.

Figure 3:
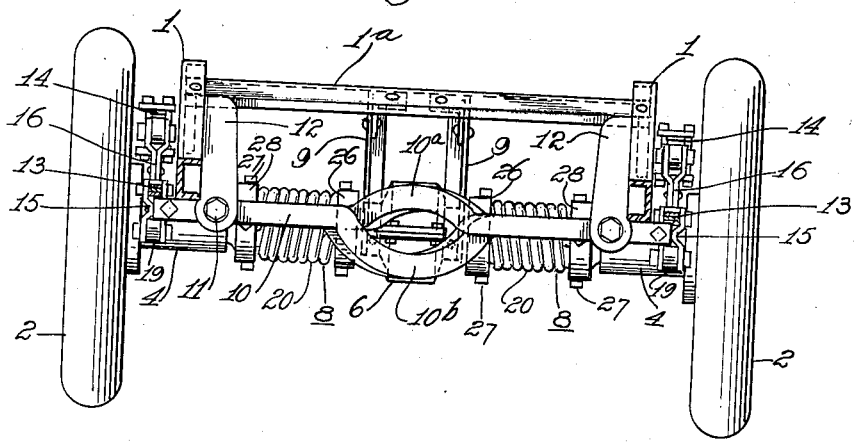
Figure 3 is a rear elevation taken substantially as indicated at line 3—3 on Figure 1.

For purposes of illustration this invention is shown as applied to the driving wheels of an automobile, but it may be understood that the axle structure shown herein is also applicable to the front wheels, and that the chassis structure may be applicable to other vehicles. Figure 1 shows the upwardly bent side frame members 1 associated with the rear wheels, which are the driving wheels of the vehicle, and whose positions are denoted in broken lines at 2, 2. Each wheel is mounted on a stub axle 3 carried in a journal box 4. Preferably, at the middle of the vehicle, Figure 2 shows the usual propeller drive shaft 5 leading into a housing 6 which may enclose any standard type of differential gearing for distributing power to the two wheels 2, 2. The differential includes short drive shafts extending laterally from the housing 6; each of these shafts is connected to one of the stub axles 3 by means of the flexible drive member seen at 8 in Figure 2.

It may be understood that, preferably, the differential housing 6 is anchored firmly to the frame itself by means of any suitable bracket members, of which fragments are seen at 9 in Figure 2, and which may extend to any convenient cross members of the frame which will normally be provided connecting the side members 1, 1, but which are omitted from Figures 1 and 2 for the purpose of simplifying the views, one of them being shown at 1ª on Figure 3. In order to provide proper cushioning of the frame, and easy riding qualities, the wheels themselves must be mounted yieldingly with respect to the side frames 1, 1. To accomplish this I employ a novel axle structure in which each of the journal boxes 4, 4 is carried rigidly at the ends of a pair of radius bars 10, 10. The bars extend from the journal boxes across the frame, where they are hingedly connected to the frame member 1 by means of pivot bolts 11 engaging brackets 12 attached to the web of the frame member. This arrangement permits either one of the bearings 4, and its associated wheel 2 to rise or fall with respect to the frame, in an arc, which is almost vertical, and whose radius is great enough so that its curvature is practically negligible for the range of this up-and-down movement. As will be evident from Figure 2, the diverging bars 10 of one pair extend across the bars 10 of the other pair, and the principal portions of both pairs of bars lie substantially in a common plane. Thus, to prevent interference of the bars with each other in the relative up-and-down movements of the frame and its wheels, the middle portions of one pair of bars are bent upward at 10ª and the middle portions of the other pair of bars are bent downwardly at 10ᵇ as indicated by the shading in Figure 2, and as seen more clearly in Figure 3. Any suitable spring cushion may be interposed between each of the axles 3 and the adjacent side frame 1 and for purposes of illustration I have shown a spring suspension system comprising cantilever springs 13 and 14 secured to the side frame and connected by shackle links 15 and 16, respectively, to a lever arm 18 which is pivotally engaged with a lug 19 projecting from the journal box 4 of the axle, as seen in Figure 1. This particular spring system is the subject of my Patent No. 2,069,399, dated February 2, 1937, and need not be further described herein.

Figure 4:
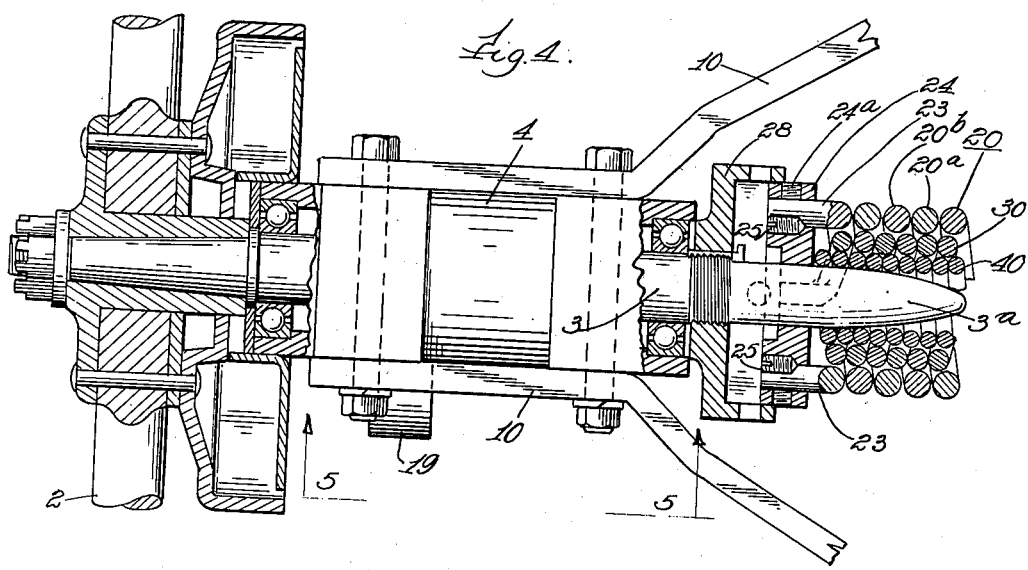
Figure 4 is a detail plan view of the stub axle and bearing for one wheel, and a portion of the flexible drive member connected therewith, certain parts being shown in section substantially at the plane of the axis of said axle.
Figure 6:
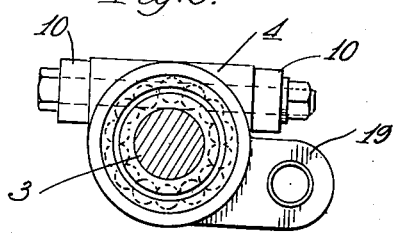
Figure 6 is an end elevation of the bearing shown in Figure 5.
Figure 5:
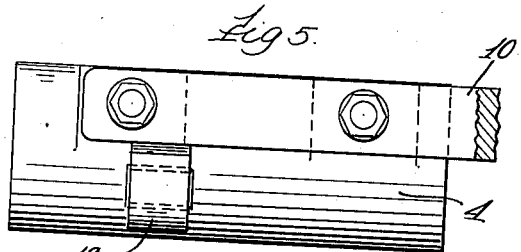
Figure 5 is a detail elevation of the axle bearing with radius bars attached thereto.

The fixed mounting of the differential housing 6 and the movable mounting of the wheels 2 with respect to the frame, requires flexible drive connections between the differential and stub axles thereof. Such a connection 8 is shown in some detail in Figures 4, 7 and 8, as consisting of an outer coil spring 20, an inner coil spring 30, and a flexible core 40, which is also a coil spring. The outer spring 20, is, in effect, a double coil, consisting of two strands 20ᵃ and 20ᵇ of heavy spring stock coiled side-by-side, so that their coils alternate with each other, and each coil includes terminals 23 which extend parallel to its axis and which are anchored in a terminal block 24 in which they may be secured by any suitable means. Figure 4 illustrates one method which consists in drilling holes into the block 24 in such positions that the holes lap into the terminals 23 of the coil so that when these holes are threaded, and set screws 25 are inserted therein, the terminals 23 are firmly locked in the block. The stub axle 3 is provided with a cup flange 28 into which the terminal block 24 may be fastened as by screws 27 and the springs 20 may be connected to the differential in the same manner.

As will be noted from Figures 2 and 3, the two coils 20 leading respectively from opposite sides of the differential, are of opposite pitch, that is, one is coiled right-handed and the other is coiled left-handed. Thus they are adapted to work in unison in transmitting the drive in a given direction. Similarly, the two coils 30 are coiled in opposite directions with respect to each other, and, preferably, the flexible core coils 40 are likewise of opposite pitch.

It will be seen that with the divergent radius bars 10 controlling the up-and-down movement of each wheel 2 independently of the other wheel, and with the flexible drive units 8 transmitting power to said wheels throughout their range of vertical movement relative to the frame, the riding qualities of the vehicle will be unusually smooth and satisfactory, and the wear and tear on the power plant will be reduced to a minimum. It is also of considerable advantage to have the differential mechanism firmly secured in rigid relation to the main frame, so that it is no longer an element of the "unsprung" weight as heretofore in typical automobile construction.

While there is shown and described herein certain specific structure embodying the invention, it will be manifest to those skilled in the art that various modifications and rearrangements of the parts may be made without departing from the spirit and scope of the invention, and that the same is not limited to the particular form herein shown and described, except in so far as indicated by the appended claims.

I claim:

1. In a road vehicle having a frame including side members, a pair of wheels disposed respectively outside and adjacent said side members, a live axle for each of said wheels, a bearing for each axle adjacent the inner side of the wheel, and means connecting each of said bearings to the frame comprising a pair of radius bars secured rigidly to the front and rear sides, respectively of the bearing and extending divergently across the frame into pivotal connection with the side member which is adjacent the other wheel to permit each wheel to swing vertically with respect to the frame and about the axis of said pivotal connection between its radius bars and the side member.

2. In a road vehicle having a frame including side members, a pair of wheels disposed respectively outside and adjacent said side members, a live axle for each of said wheels, a bearing for each axle adjacent the inner side of the wheel, and means connecting each of said bearings to the frame comprising a pair of radius bars secured rigidly to the bearing and extending across the frame into connection with the side member which is adjacent the other wheel, one bar of each pair extending obliquely forward from the bearing toward the side member and the other bar of the pair extending obliquely rearward from said bearing to said side member, and said connection between the radius bars and the side member including substantially horizontal, aligned pivots which permit each wheel to swing vertically with respect to the frame and about the axis of such pivotal connection.

3. In a road vehicle having a frame including longitudinally extending side members, a pair of wheels disposed respectively outside and adjacent said side members, and a bearing for each wheel extending from the inner side of the wheel, means connecting each of said bearings to the frame comprising a pair of radius bars secured rigidly to the bearing and extending divergently across the frame into connection with the side member which is adjacent the other wheel, the said connection between the radius bars and the side member including substantially horizontal, aligned pivots which permit each wheel to swing vertically with respect to the frame and about the axis of such pivotal connection.

FRANK M. WHITE.